(12) United States Patent
Bespalov et al.

(10) Patent No.: US 7,397,250 B2
(45) Date of Patent: Jul. 8, 2008

(54) HIGH RESOLUTION RESISTIVITY EARTH IMAGER

(75) Inventors: Alexandre N. Bespalov, Spring, TX (US); Gregory B. Itskovich, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/209,531

(22) Filed: Aug. 23, 2005

(65) Prior Publication Data
US 2007/0046290 A1    Mar. 1, 2007

Related U.S. Application Data

(63) Continuation-in-part of application No. 10/986,096, filed on Nov. 12, 2004, now abandoned.

(51) Int. Cl.
*G01V 3/00* (2006.01)
*G01V 3/02* (2006.01)
(52) U.S. Cl. .................. 324/357; 324/347
(58) Field of Classification Search .......... 324/360, 324/366–370, 373–375, 347–357
See application file for complete search history.

(56) References Cited

U.S. PATENT DOCUMENTS

| | | | |
|---|---|---|---|
| 2,930,696 A | 3/1960 | Baker | 324/10 |
| 3,365,658 A | 1/1968 | Birdwell | 324/10 |
| 4,122,387 A | 10/1978 | Ajam et al. | 324/10 |
| 4,468,623 A | 8/1984 | Gianzero et al. | 324/367 |
| 4,692,908 A | 9/1987 | Ekstrom et al. | 367/27 |
| 5,502,686 A | 3/1996 | Dory et al. | 367/34 |
| 5,677,631 A | 10/1997 | Reittinger et al. | 324/324 |
| 6,220,371 B1 | 4/2001 | Sharma et al. | 175/50 |
| 6,600,321 B2 | 7/2003 | Evans | 324/369 |
| 6,714,014 B2 | 3/2004 | Evans et al. | 324/374 |
| 6,803,039 B2 | 10/2004 | Tsuji et al. | 424/144.1 |
| 6,809,521 B2 | 10/2004 | Tabarovsky et al. | 324/374 |
| 2002/0153897 A1 | 10/2002 | Evans et al. | 324/374 |
| 2006/0103388 A1 * | 5/2006 | Forgang et al. | 324/338 |

FOREIGN PATENT DOCUMENTS

CA    685727    5/1960

* cited by examiner

*Primary Examiner*—Reena Aurora
(74) *Attorney, Agent, or Firm*—Madan, Mossman & Sriram, P.C.

(57) ABSTRACT

Phase-sensitive measurements are made by a resistivity imaging tool in a borehole having non-conductive mud in a conductive earth formation at a plurality of frequencies. From the phase sensitive measurements, the formation resistivity can be determined with higher sensitivity than is possible with the single frequency measurements. Tool standoff can also be determined from a knowledge of the mud resistivity and/or dielectric constant. Formation resistivity may also be determined when the effect of formation capacitance cannot be ignored.

24 Claims, 5 Drawing Sheets

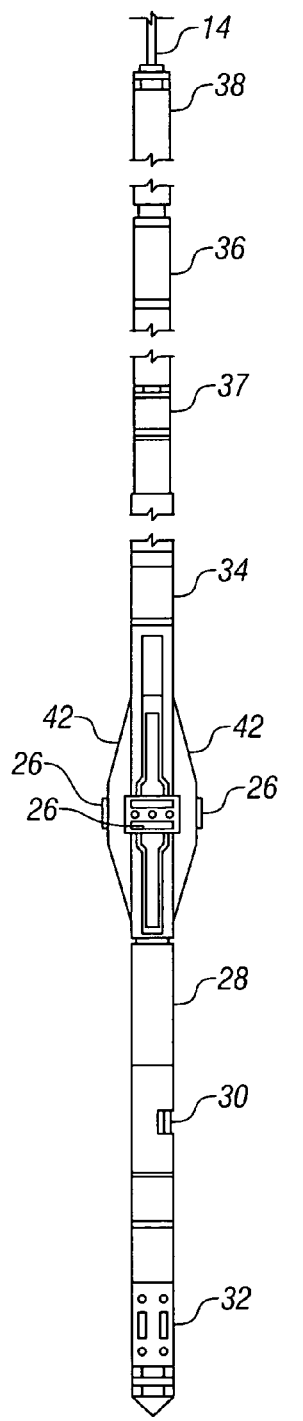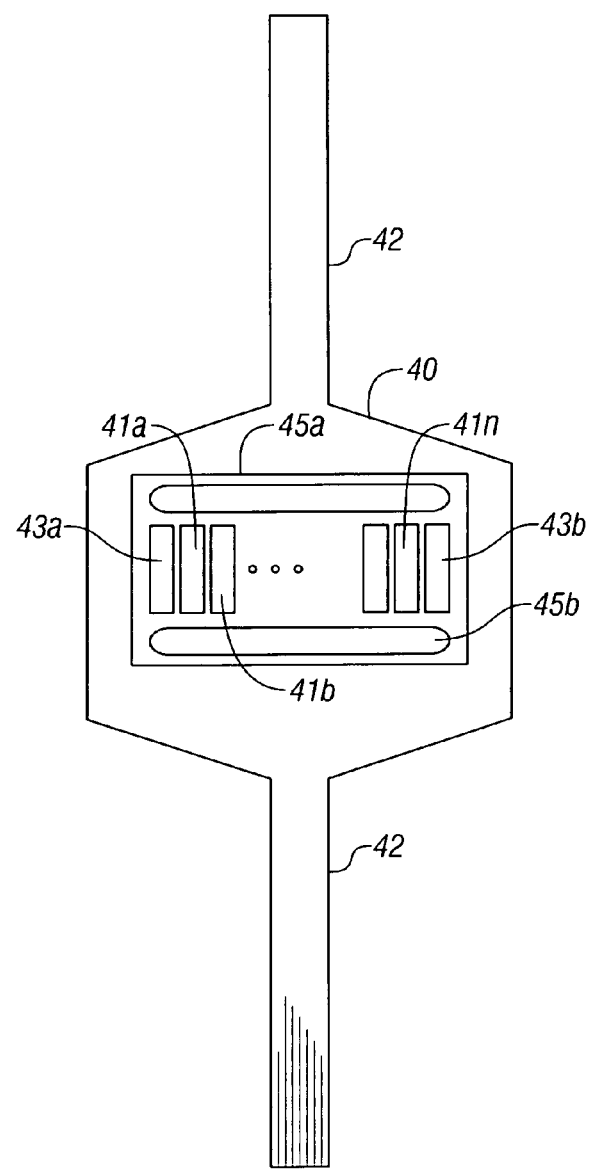
FIG. 2A
*(Prior Art)*
FIG. 2B
*(Prior Art)*

HIGH RESOLUTION RESISTIVITY EARTH IMAGER

CROSS-REFERENCES TO RELATED APPLICATIONS

This application claims priority as a continuation-in-part of U.S. patent application Ser. No. 10/986,096 filed on 12 Nov. 2004, now abandoned.

BACKGROUND OF THE INVENTION

1. Field of the Invention

This invention generally relates to exploration for hydrocarbons involving electrical investigations of a borehole penetrating an earth formation. More specifically, this invention relates to highly localized borehole investigations multifrequency focusing of survey currents injected into the wall of a borehole by capacitive coupling of electrodes on a tool moved along the borehole with the earth formation.

2. Background of the Art

Electrical earth borehole logging is well known and various devices and various techniques have been described for this purpose. Broadly speaking, there are two categories of devices used in electrical logging devices. In the first category, a measure electrode (current source or sink) are used in conjunction with a diffuse return electrode (such as the tool body). A measure current flows in a circuit that connects a current source to the measure electrode, through the earth formation to the return electrode and back to the current source in the tool. In inductive measuring tools, an antenna within the measuring instrument induces a current flow within the earth formation. The magnitude of the induced current is detected using either the same antenna or a separate receiver antenna. The present invention belongs to the first category.

There are several modes of operation: in one, the current at the measuring electrode is maintained constant and a voltage is measured while in the second mode, the voltage of the electrode is fixed and the current flowing from the electrode is measured. Ideally, it is desirable that if the current is varied to maintain constant the voltage measured at a monitor electrode, the current is inversely proportional to the resistivity of the earth formation being investigated. Conversely, it is desirable that if this current is maintained constant, the voltage measured at a monitor electrode is proportional to the resistivity of the earth formation being investigated. Ohm's law teaches that if both current and voltage vary, the resistivity of the earth formation is proportional to the ratio of the voltage to the current.

Birdwell (U.S. Pat. No. 3,365,658) teaches the use of a focused electrode for determination of the resistivity of subsurface formations. A survey current is emitted from a central survey electrode into adjacent earth formations. This survey current is focused into a relatively narrow beam of current outwardly from the borehole by use of a focusing current emitted from nearby focusing electrodes located adjacent the survey electrode and on either side thereof. Ajam et al (U.S. Pat. No. 4,122,387) discloses an apparatus wherein simultaneous logs may be made at different lateral distances through a formation from a borehole by guard electrode systems located on a sonde which is lowered into the borehole by a logging cable. A single oscillator controls the frequency of two formation currents flowing through the formation at the desired different lateral depths from the borehole. The armor of the logging cable acts as the current return for one of the guard electrode systems, and a cable electrode in a cable electrode assembly immediately above the logging sonde acts as the current return for the second guard electrode system. Two embodiments are also disclosed for measuring reference voltages between electrodes in the cable electrode assembly and the guard electrode systems Techniques for investigating the earth formation with arrays of measuring electrodes have been proposed. See, for example, the U.S. Pat. No. 2,930,969 to Baker, Canadian Patent No. 685727 to Mann et al., U.S. Pat. No. 4,468,623 to Gianzero, and U.S. Pat. No. 5,502,686 to Dory et al. The Baker patent proposed a plurality of electrodes, each of which was formed of buttons which are electrically joined by flexible wires with buttons and wires embedded in the surface of a collapsible tube. The Mann patent proposes an array of small electrode buttons either mounted on a tool or a pad and each of which introduces in sequence a separately measurable survey current for an electrical investigation of the earth formation. The electrode buttons are placed in a horizontal plane with circumferential spacings between electrodes and a device for sequentially exciting and measuring a survey current from the electrodes is described.

The Gianzero patent discloses tool mounted pads, each with a plurality of small measure electrodes from which individually measurable survey currents are injected toward the wall of the borehole. The measure electrodes are arranged in an array in which the measure electrodes are so placed at intervals along at least a circumferential direction (about the borehole axis) as to inject survey currents into the borehole wall segments which overlap with each other to a predetermined extent as the tool is moved along the borehole. The measure electrodes are made small to enable a detailed electrical investigation over a circumferentially contiguous segment of the borehole so as to obtain indications of the stratigraphy of the formation near the borehole wall as well as fractures and their orientations. In one technique, a spatially closed loop array of measure electrodes is provided around a central electrode with the array used to detect the spatial pattern of electrical energy injected by the central electrode. In another embodiment, a linear array of measure electrodes is provided to inject a flow of current into the formation over a circumferentially effectively contiguous segment of the borehole. Discrete portions of the flow of current are separately measurable so as to obtain a plurality of survey signals representative of the current density from the array and from which a detailed electrical picture of a circumferentially continuous segment of the borehole wall can be derived as the tool is moved along the borehole. In another form of an array of measure electrodes, they are arranged in a closed loop, such as a circle, to enable direct measurements of orientations of resistivity of anomalies. U.S. Pat. No. 6,714,014 to Evans et al, having the same assignee as the present invention and the contents of which are incorporated herein by reference, teaches the use of capacitive coupling with both oil-based mud and water-based mud.

The Dory patent discloses the use of an acoustic sensor in combination with pad mounted electrodes, the use of the acoustic sensors making it possible to fill in the gaps in the image obtained by using pad mounted electrodes due to the fact that in large diameter boreholes, the pads will necessarily not provide a complete coverage of the borehole.

The prior art devices, being contact devices, are sensitive to the effects of borehole rugosity: the currents flowing from the electrodes depend upon good contact between the electrode and the borehole wall. If the borehole wall is irregular, the contact and the current from the electrodes is irregular, resulting in inaccurate imaging of the borehole. A second drawback is the relatively shallow depth of investigation caused by the use of measure electrodes at the same potential as the pad and the resulting divergence of the measure currents. U.S. Pat. No. 6,809,521 to Tabarovsky et al. discloses a multifrequency method for determination of formation resistivity. The assumption made in Tabarovsky is that $$\frac{\sigma_1}{\varepsilon_1} \ll \omega \ll \frac{\sigma_2}{\varepsilon_2}$$

where the σ's are conductivities, the ε's are dielectric constant, ω is the operating frequency, the subscript 1 refers to the mud and the subscript 2 refers to the formation. The first of the two inequalities is easily satisfied with oil based mud where the mud conductivity is extremely small. However, if the mud has a finite conductivity, the condition is hard to satisfy. It would be desirable to have an apparatus and method of determination of formation resistivity that is relatively insensitive to borehole rugosity and can be used with either water based or with oil-based muds for a wide range of formation resistivities. The present invention satisfies this need.

SUMMARY OF THE INVENTION

One embodiment of the invention is an apparatus for evaluating an earth formation penetrated by a borehole. The apparatus includes at least one measure electrode coupled to a source of electrical current. The at least one measure electrode conveys a measure current into the formation at more than one frequency. The apparatus also includes a processor which estimates a resistivity parameter of the earth formation based at least in part on a real part and an imaginary part of an impedance at the at least one measure electrode each of the plurality of frequencies. The processor may estimate the real and imaginary parts of the impedance using the measure current. The processor may further determine a capacitance between the measure electrode and the borehole wall and/or the resistance between the measure electrode and the borehole wall. The processor may further determine a standoff of the electrode from the borehole wall. When more than one measure electrode is used, the processor may determine a shape of the borehole. More than one measure electrode may be positioned on a pad extendable from a body of a logging tool. The apparatus may have more than one pad. The resistivity parameter may be a resistivity image of the borehole wall. The apparatus may also include a device which measures the resistivity and/or dielectric constant of the fluid in the borehole. The measure electrode may be conveyed into the borehole on a wireline, drilling tubular and/or slickline. The processor may determine the resistivity parameter when a displacement current in the formation is more than about 10% of the conductive current in the formation: if so, the processor may estimate the resistivity parameter by solving a set of nonlinear equations.

Another embodiment of the invention is a method of evaluating an earth formation penetrated by a borehole. At least one measure electrode coupled to a source of electrical current is used for conveying a measure current into the formation at a plurality of frequencies. An estimate is made of a resistivity parameter of the earth formation based at least in part on a real part and an imaginary part of an impedance determined from the measure current at each of the plurality of frequencies. Optionally, a resistance and/or a capacitance between the measure electrode and the borehole wall may be determined. The determined resistance and/or capacitance may be used to determine a standoff of the electrode from the borehole wall. When more than one measure electrode is used, the shape of the borehole may be determined. More than one electrode may be positioned on a pad extendable from a body of logging tool. Measurements may be made indicative of the resistivity and/or dielectric constant of the borehole fluid. The method may estimate the resistivity parameter of the formation even when the displacement current in the formation is more than about 10% of the conductive current in the formation: this may be done by solving a set of nonlinear equations.

Another embodiment of the invention is a computer readable medium for use with an apparatus used for evaluating an earth formation penetrated by a borehole. The apparatus includes at least one measure electrode connected to a source of electrical current and conveying a measure current into the formation at a plurality of frequencies. The medium includes instructions which enable a processor to estimate a resistivity parameter of the earth formation based at least in part on a real and imaginary part of an impedance determined at the plurality of frequencies. The instructions may further enable the processor to determine a standoff of the measure electrode. The medium may be a ROM, an EPROM, an EAROM, a Flash Memory, and/or an Optical disk.

BRIEF DESCRIPTION OF THE FIGURES

The present invention is best understood with reference to the accompanying figures in which like numerals refer to like elements and in which:

FIG. 2A (prior art) is a mechanical schematic view of an exemplary imaging tool;

FIG. 2B (prior art) is a detail view of an electrode pad of an exemplary logging tool;

DETAILED DESCRIPTION OF THE INVENTION

Figure 1:
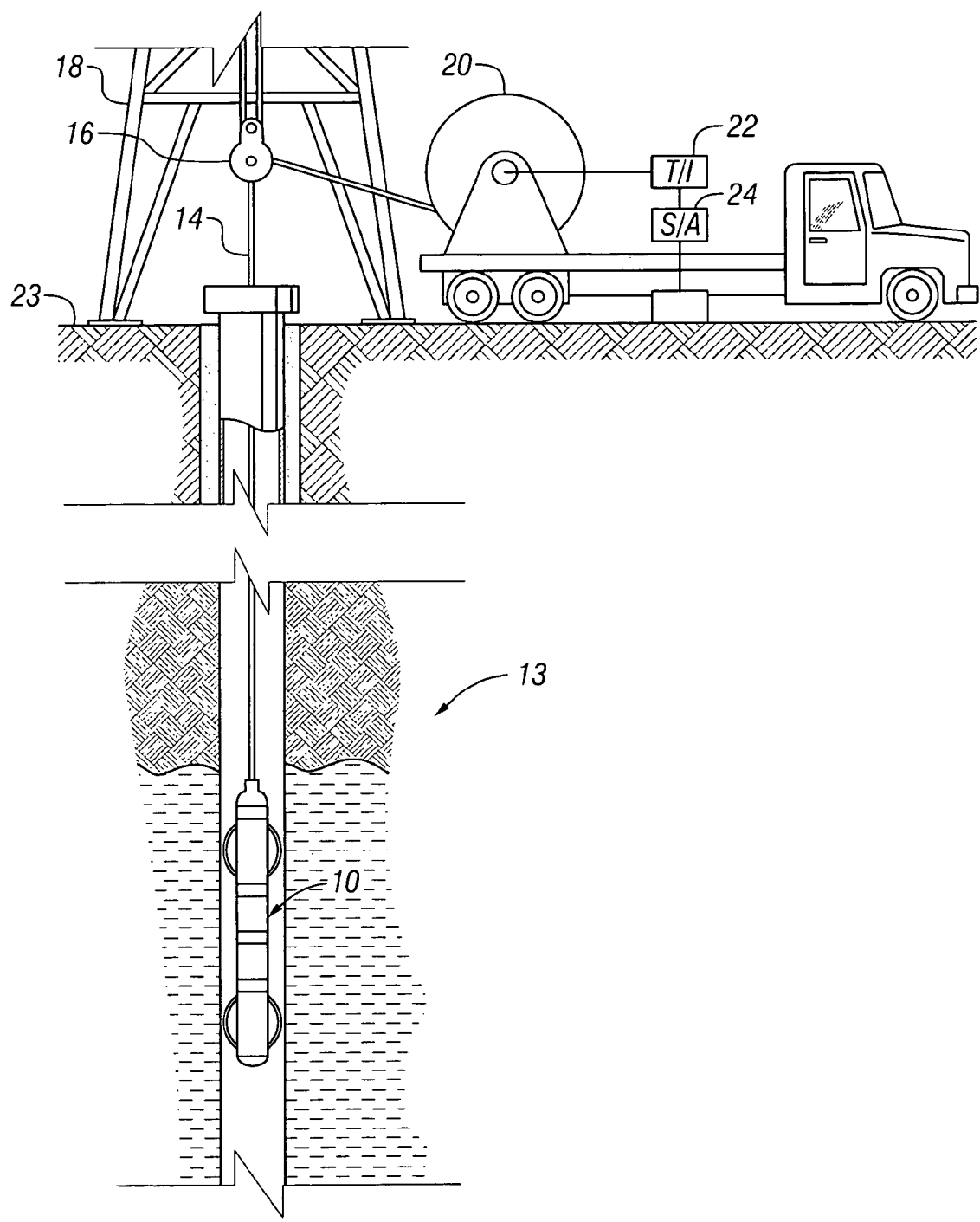
FIG. 1 (prior art) shows an exemplary logging tool suspended in a borehole.

FIG. 1 shows an exemplary imaging tool 10 suspended in a borehole 12, that penetrates earth formations such as 13, from a suitable cable 14 that passes over a sheave 16 mounted on drilling rig 18. By industry standard, the cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data.

FIG. 2a is a schematic external view of a borehole sidewall imager system. The tool 10 comprising the imager system includes resistivity arrays 26 and, optionally, a mud cell 30 and a circumferential acoustic televiewer 32. Electronics modules 28 and 38 may be located at suitable locations in the system and not necessarily in the locations indicated. The components may be mounted on a mandrel 34 in a conventional well-known manner. The outer diameter of the assembly is about 5 inches and about fifteen feet long. An orientation module 36 including a magnetometer and an accelerometer or inertial guidance system may be mounted above the imaging assemblies 26 and 32. The upper portion 38 of the tool 10 contains a telemetry module for sampling, digitizing and transmission of the data samples from the various components uphole to surface electronics 22 in a conventional manner. If acoustic data are acquired, they are preferably digitized, although in an alternate arrangement, the data may be retained in analog form for transmission to the surface where it is later digitized by surface electronics 22.

Also shown in FIG. 2A are three resistivity arrays 26 (a fourth array is hidden in this view. Referring to FIGS. 2A and 2B, each array includes measure electrodes 41a, 41b, ... 41n for injecting electrical currents into the formation, focusing electrodes 43a, 43b for horizontal focusing of the electrical currents from the measure electrodes and focusing electrodes 45a, 45b for vertical focusing of the electrical currents from the measure electrodes. By convention, "vertical" refers to the direction along the axis of the borehole and "horizontal" refers to a plane perpendicular to the vertical.

Figure 3:
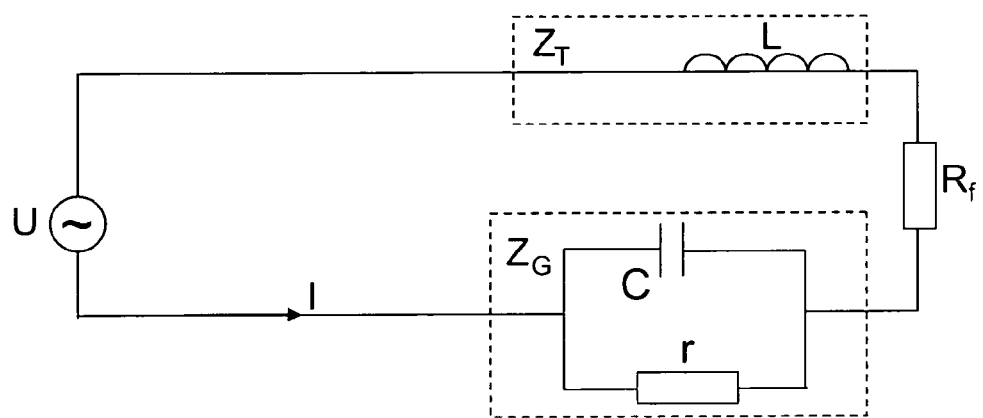
FIG. 3 is an equivalent circuit representation of a resistivity tool in a borehole.

The approximate schematic circuit diagram is presented in FIG. 3. It shows that the measured effective impedance $Z_e$ depends on the internal impedance of the tool $Z_T$, the impedance due to the gap between receiver and formation $Z_G$ and the formation resistivity $R_f$. The impedance between the return electrode and the formation is ignored as being very small. This is a reasonable assumption due to the large area of the return electrode. If U is the applied voltage and I is the measured current then the impedance $Z_e$ is $$Z_e = Z_T + Z_G + R_f = \frac{U}{I}. \tag{1}$$

In case of a conductive formation (with a resistivity less than 10 Ω-m) and oil-based mud, the contribution of the formation into the effective impedance is small $R_f << Z_T + Z_G$. This results in a reduction of the sensitivity of the measured impedance to the resistivity of formation. The gap impedance $Z_G$, which depends on the mud properties and the receiver standoff, becomes a major contributor into the effective impedance.

The present invention determines the formation resistivity using measurements at a plurality of frequencies. For the case of measurements at two frequencies $f_1$ and $f_2$, we get $$Z_{e1} = i\omega_1 L + R_f + \frac{1}{r^{-1} + i\omega_1 C}, \tag{2}$$

and $$Z_{e2} = i\omega_2 L + R_f + \frac{1}{r^{-1} + i\omega_2 C}.$$

In eqn. (2), $\omega = 2\pi f$ is the angular frequency. Eqn. (2) may be written in the form $$Z_{e1} = A_1 + iB_1,$$

$$Z_{e2} = A_2 + iB_2 \tag{3},$$

where $A_1, A_2, B_1$ and $B_2$ are the real and imaginary part of the impedances $Z_{e1}$ and $Z_{e2}$.

From eqns. (1) and (2), we get the result:

$$A_1 - A_2 = r^{-1}\left(\frac{1}{r^{-2} + (\omega_1 C)^2} - \frac{1}{r^{-2} + (\omega_2 C)^2}\right), \tag{4}$$

$$\frac{B_1}{\omega_1} - \frac{B_2}{\omega_2} = -C\left(\frac{1}{r^{-2} + (\omega_1 C)^2} - \frac{1}{r^{-2} + (\omega_2 C)^2}\right).$$

This gives the further result:

$$\frac{\frac{B_1}{\omega_1} - \frac{B_2}{\omega_2}}{A_1 - A_2} = G = Cr. \tag{5}$$

From eqn. (5) and the first equation from eqn. (4), we get the resistivity of the gap r as:

$$r = (A_1 - A_2) \bigg/ \left(\frac{1}{1 + (\omega_1 G)^2} - \frac{1}{1 + (\omega_2 G)^2}\right). \tag{6}$$

Substituting from eqn. (6) into eqn. (5) gives the capacitance between the measure electrode and the formation as:

$$C = \frac{\frac{B_1}{\omega_1} - \frac{B_2}{\omega_2}}{A_1 - A_2} \bigg/ r = (A_1 - A_2) \bigg/ \left(\frac{1}{1 + (\omega_1 G)^2} - \frac{1}{1 + (\omega_2 G)^2}\right), \tag{7}$$

while the resistivity $R_f$ of the formation is given as $$R_f = A_1 - \frac{(\omega_1 C)^2 r}{r^2 + (\omega_1 C)^2} = A_2 - \frac{(\omega_2 C)^2 r}{r^2 + (\omega_2 C)^2}. \tag{8}$$

It should be pointed out that the results derived above involve determination of both the real and imaginary parts of the complex impedance. This is different from the dual frequency (and the multifrequency focusing) method disclosed in Tabarovsky. The determined impedance in Tabarovsky is given by equation (13) in the patent and is reproduced here using the notation of the present document:

$$R_f = \frac{\omega_1^2 A_1 - \omega_2^2 A_2}{\omega_1^2 - \omega_2^2}. \tag{9}$$

This expression is much simpler than the results of the present invention and does not use the imaginary part of the measured impedance. The simplification results from the assumption made in Tabarovsky that $$\frac{\sigma_1}{\varepsilon_1} \ll \omega \ll \frac{\sigma_2}{\varepsilon_2}.$$

One embodiment of the present invention assumes that the dielectric effects of the formation are small (the second inequality): this is usually satisfied at frequencies below about 10 MHz. As noted above, the present invention is able to determine the resistivity of the gap between the electrode and the wall, something that is assumed in Tabarovsky to be infinite.

Figure 4:
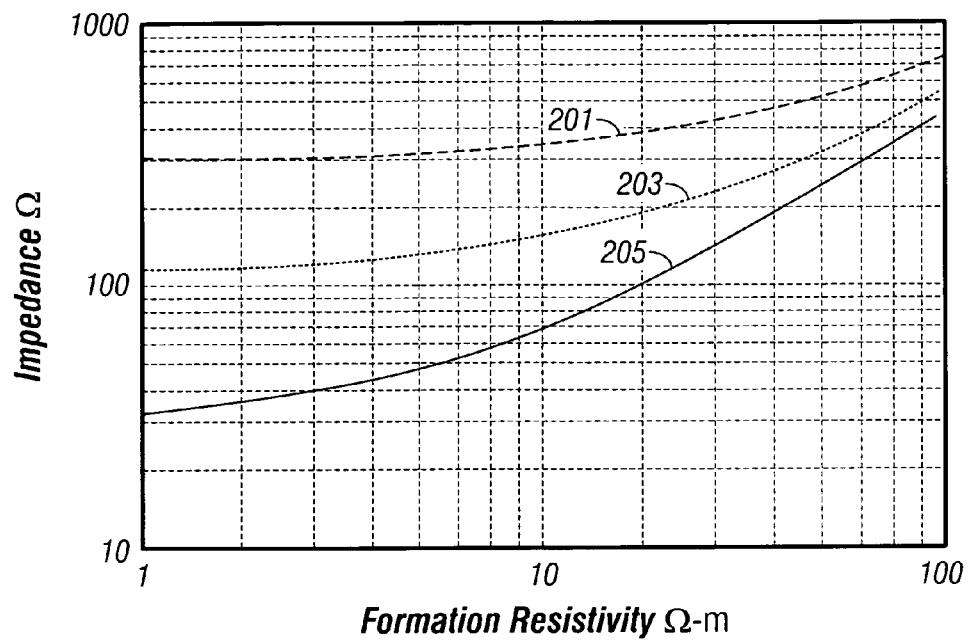
FIG. 4 shows modeling results of the improved sensitivity to formation resistivity using the method of the present invention over single frequency measurements.

Turning now to FIG. 4, modeling results of using the invention described above are shown. The example corresponds to the case of tool placed in the 8.5 inch (21.59 cm) well filled with $10^4$ Ω-m resistive mud. The formation was modeled by a cylindrical layer with resistivity varying from 1 Ω-m to 100 Ω-m. The return of the tool was modeled as a conductive cylinder of 10 m in length. Current is injected into the formation through 1.6 cm long cylindrical electrode that has 1 mm standoff with respect to the formation. The transmitter provides an output voltage of 1V at frequency of 1 MHz and 2 MHz. The abscissa is the formation resistivity and the ordinate is the measured resistance at the tool. The curve 201 shows the measured resistance at 1 MHz, the curve 203 shows the measured resistance at 2 MHz while the curve 205 shows the result of using the dual frequency method described above. It can be seen that the curve 205 has an improved sensitivity to the formation resistivity compared to the single frequency impedance measurements.

The advantage of the dual frequency impedance is also observed in the case of stratified formation model. FIG. 4 shows the results of mathematical modeling for a formation which includes a sequence of resistive (10 Ω-m) and conductive (1 Ω-m) layers. The thickness of the layers is varying from the left to the right between 0.5 in (1.27 cm) to 4 inches (10.16 cm). The curve 251 which is the measured impedance at 1 MHz is almost completely insensitive to all but the thickest layers. The curve 253 which is the measured impedance at 2 MHz has an improved response relative to the 1 MHz response. The dual frequency method of the present invention gives results 255 far superior to the single frequency measurements.

As noted above, the multifrequency measurements enable the estimation of the capacitance and resistance of the gap between measure electrode and formation. See eqns. (6) and (7). The standoff of the electrode can be easily derived from the estimated gap capacitance and gap resistance. The capacitance C and resistance r uniquely depend on the gap d, we can write it down as follows $$C = \frac{\varepsilon_0 \varepsilon S}{d}, \quad (9)$$

$$r = \frac{\rho d}{S} \quad (10)$$

where S is the area of the electrode, ρ is the resistivity of the mud and ε is its dielectric constant.

From eqns. (9), and (10) we can derive two redundant expressions for the gap d $$d = \frac{\varepsilon_0 \varepsilon S}{C}, \quad (11)$$

and $$d = \frac{rS}{\rho} \quad (12)$$

The dual-frequency correction considered above given in eqna. (4)-(8) is based on the approximate circuit diagram presented in FIG. 3. In that circuit, the dielectric effects in a formation are neglected—the latter one is represented by a resistance $R_f$ only. This approximation is possible when the displacement currents in a formation are much less than the conduction current—that is, when the parameter $\rho_f \omega \epsilon_f \epsilon_0$ is much less than 1 (where $\rho_f$ is the resistivity of the formation and $\epsilon_f$ is its dielectric constant). This condition may not be satisfied in highly resistive formations and/or for high operational frequencies: for example, if $\rho_r = 100$ Ω-m, $\epsilon_r = 20$ and the frequency is 10 MHz, then $\rho_r \epsilon_r \omega \approx 1$.

Figure 6:
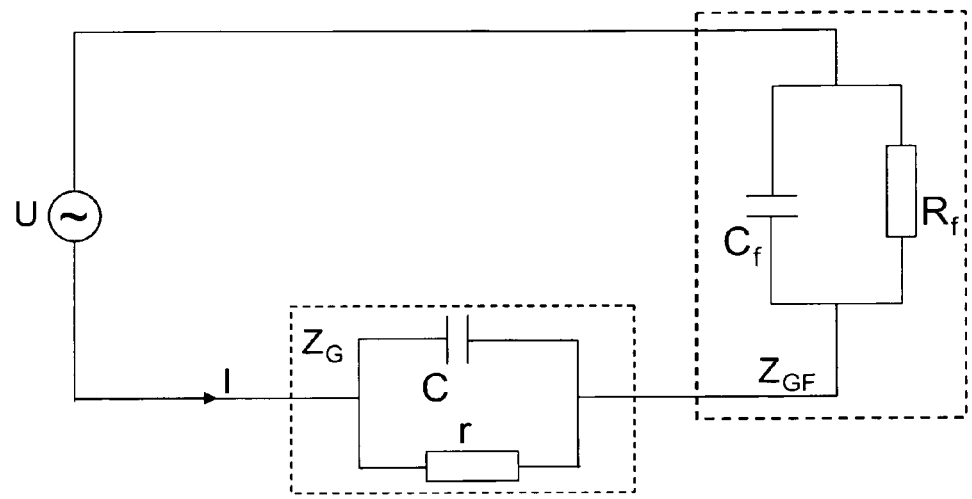
FIG. 6 shows an equivalent circuit representation of an alternate embodiment of the invention in which the displacement current is significant.

In another embodiment of the invention, a dual frequency correction that does not make the assumption $\rho_r \epsilon_r \omega \ll 1$ is implemented. As a practical matter, this method may be used when the displacement current is more than about 10% of the conductive current. The equivalent circuit diagram is given in FIG. 6 and differs from the equivalent circuit of FIG. 3 by the addition of the capacitor $C_f$ representing the dielectric properties of the formation, and by removal of the tool's inner resistance $Z_T$ (assumed to be negligible). Thus, instead of eqn. (2), we now have:

$$Z_{e1} = \frac{1}{R_f^{-1} + i\omega_1 C_f} + \frac{1}{r^{-1} + i\omega_1 C} = A_1 i B_1, \quad (13)$$

$$Z_{e2} = \frac{1}{R_f^{-1} + i\omega_2 C_f} + \frac{1}{r^{-1} + i\omega_2 C} = A_2 + i B_2.$$

This nonlinear system of four equations is solved in the following way. First, we use the notation:

$$\alpha_m = rC, \alpha_f = R_f C_f \quad (14).$$

We next replace in eqn. (13) the conductances C, $C_f$ by $\alpha_m/r$, $\alpha_f/R_f$ correspondingly, and then eliminate the resistances r, $R_f$. It results in the following system of two equations:

$$(\omega_2^2 A_2 - \omega_1^2 A_1)\alpha_m \alpha_f + (\omega_2 B_2 - \omega_1 B_1)(\alpha_m + \alpha_f) = A_2 - A_1$$

$$(\omega_2 B_2 - \omega_1 B_1)\alpha_m \alpha_f + (A_1 - A_2)(\alpha_m + \alpha_f) = B_2/\omega_2 - B_1/\omega_1 \quad (15),$$

which is linear with respect to the unknowns $\alpha_m \alpha_f$, $\alpha_m + \alpha_f$, and thus can be easily solved. After that, the α-coefficients themselves are calculated from their product and their sum by the formulas:

$$\alpha_m = \frac{(\alpha_m + \alpha_f) + \sqrt{(\alpha_m + \alpha_f)^2 - 4\alpha_m \alpha_f}}{2}, \quad (16)$$

$$\alpha_f = \frac{(\alpha_m + \alpha_f) - \sqrt{(\alpha_m + \alpha_f)^2 - 4\alpha_m \alpha_f}}{2}.$$

Here we use the assumption that $\alpha_m > \alpha_f$ i.e., that the mud is much more resistive than the formation. The formation resistance $R_f$ is then calculated from:

$$R_f = \frac{(\alpha_m A_1 + B_1/\omega_1)(1 + \omega_1^2 \alpha_f^2)}{\alpha_m - \alpha_f}. \quad (15)$$

Figure 5:
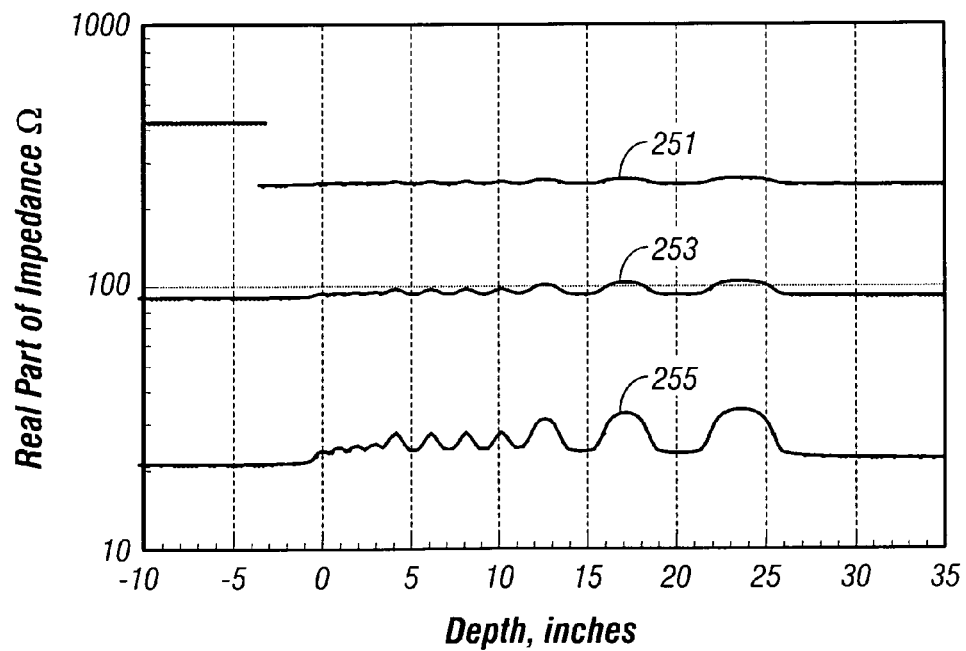
FIG. 5 shows modeling results of using the method of the present invention for a layered earth formation.
Figure 7:
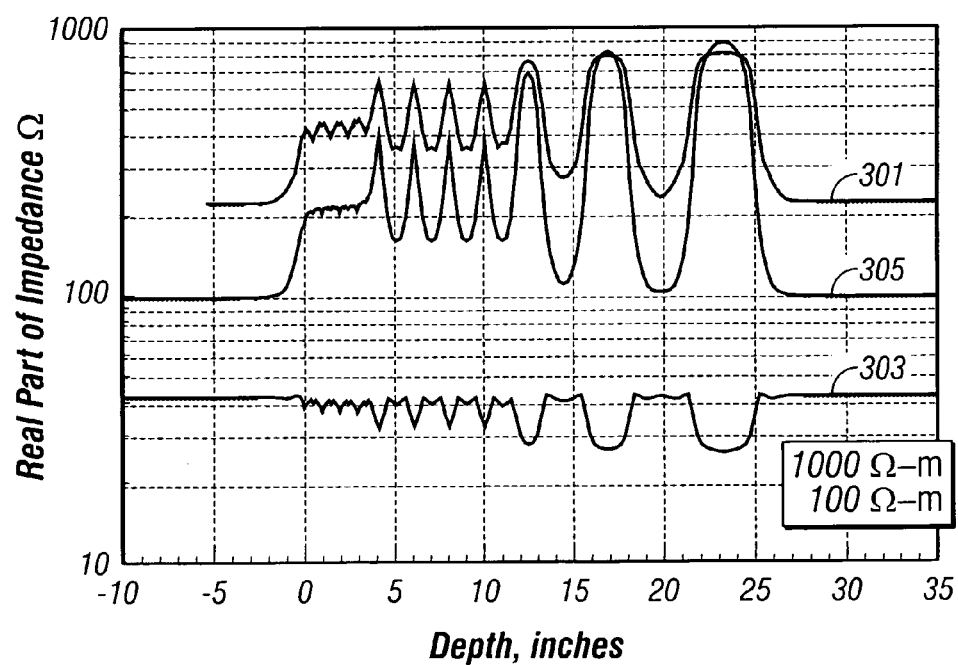
FIG. 7 shows modeling results for the circuit of FIG. 6.

The results of application of the dual-frequency correction when the formation dielectric constant is considered are presented in FIG. 7. The model is similar to that in FIG. 5 but all formation resistivities are 100 times higher; that is, the layering is 100 Ω-m and 1000 Ω-m, the dielectric constants are 20 and 10, correspondingly. It can be seen that the corrected log 305 (image) has much better dynamic range than any of the single-frequency logs 301, 303.

Determination of mud resistivity may be made downhole using the method and apparatus described in U.S. Pat. No. 6,803,039 to Fabris et al., having the same assignee as the present invention and the contents of which are incorporated herein by reference. The dielectric constant may be determined using the method and apparatus described in U.S. Pat. No. 5,677,631 to Reittinger et al., having the same assignee as the present invention and the contents of which are incorporated herein by reference. Alternatively, measurements of the mud resistivity and dielectric constant may be made at the surface and suitable temperature corrections applied. Since each of the measure electrodes gives an independent estimate of the standoff that is corrected for the formation resistivity, it is thus possible to determine the azimuthal variation of standoff and hence the shape of the borehole using measurements from a plurality of measure electrodes.

The invention has further been described by reference to logging tools that are intended to be conveyed on a wireline. However, the method of the present invention may also be used with measurement-while-drilling (MWD) tools, or logging while drilling (LWD) tools, either of which may be conveyed on a drillstring or on coiled tubing. An example of a resistivity imaging tool for MWD use is discloses in U.S. Pat. No. 6,600,321 to Evans, having the same assignee as the present invention and the contents of which are incorporated herein by reference.

Implicit in the processing of the data is the use of a computer program implemented on a suitable machine readable medium that enables the processor to perform the control and processing. The term processor as used in this application is intended to include such devices as field programmable gate arrays (FPGAs). The machine readable medium may include ROMs, EPROMs, EAROMs, Flash Memories and Optical disks. As noted above, the processing may be done downhole or at the surface.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. An apparatus for evaluating an earth formation penetrated by a borehole, the apparatus comprising:
   (a) at least one measure electrode coupled to a source of electrical current, the at least one measure electrode configured to convey a measure current into the formation at a plurality of frequencies; and
   (b) a processor which is configured to estimate a resistivity parameter of the earth formation based at least in part on a real part and an imaginary part of an impedance at the at least one measure electrode at each of the plurality of frequencies.

2. The apparatus of claim 1 wherein the processor is configured to estimate the real and imaginary parts of the impedance using the measure current.

3. The apparatus of claim 1 wherein the processor is further configured to determine at least one of (i) a capacitance between the at least one measure electrode and a borehole wall, (ii) a resistance between the at least one measure electrode and a borehole wall.

4. The apparatus of claim 3 wherein the processor is further configured to determine a standoff of the at least one measure electrode from the borehole wall.

5. The apparatus of claim 3 wherein the at least one measure electrode comprises a plurality of measure electrodes and wherein the processor is configured to determine a shape of the borehole.

6. The apparatus of claim 1 wherein the at least one measure electrode comprises a plurality of measure electrodes on a pad extendable from a body of a logging tool conveyed in the borehole.

7. The apparatus of claim 6 further comprising an additional pad having a plurality of measure electrodes, the additional pad configured to extend from the body of the logging tool.

8. The apparatus of claim 1 wherein the resistivity parameter comprises a resistivity image of the wall of the borehole.

9. The apparatus of claim 1 further comprising a device configured to make a measurement indicative of a property of a fluid in the borehole selected from (i) a resistivity, and (ii) a dielectric constant.

10. The apparatus of claim 1 wherein the at least one measure electrode is conveyed in the borehole by a device selected from (i) a wireline, (ii) a drilling tubular, and (iii) a slickline.

11. The apparatus of claim 1 wherein a displacement current in the formation is more than about 10% of a conductive current in the formation.

12. The apparatus of claim 11 wherein the processor is configured to estimate the resistivity parameter by solving a set of nonlinear equations.

13. A method of evaluating an earth formation penetrated by a borehole, the method comprising:
   (a) using at least one measure electrode coupled to a source of electrical current for conveying a measure current into the formation at a plurality of frequencies, the at least one measure electrode having a potential; and
   (b) estimating a resistivity parameter of the earth formation based at least in part on a real part and an imaginary part of an impedance determined from the measure current at each of the plurality of frequencies.

14. The method of claim 13 further comprising determining at least one of (i) a capacitance between the at least one measure electrode and a borehole wall, (ii) a resistance between the at least one measure electrode and a borehole wall.

15. The method of claim 14 further comprising determining a standoff of the at least one measure electrode from the borehole wall.

16. The method of claim 14 wherein the at least one measure electrode comprises a plurality of measure electrodes, the method further comprising determining a shape of the borehole.

17. The method of 13 further comprising disposing a plurality of measure electrodes on a pad extendable from a body of a logging tool conveyed in the borehole.

18. The method of claim 13 wherein the resistivity parameter comprises a resistivity image of the wall of the borehole.

19. The method of claim 13 further comprising obtaining at least one additional measurement indicative of a property of a fluid in the borehole, the property selected from the group consisting of (i) a resistivity, and (ii) a dielectric constant.

20. The method of claim 13 wherein a displacement current in the formation is more than about 10% of a conductive current in the formation.

21. The method of claim 13 wherein estimating the resistivity parameter further comprises solving a set of nonlinear equations.

22. A computer readable medium for use with an apparatus used for evaluating an earth formation penetrated by a borehole, the apparatus comprising:
   (a) at least one measure electrode connected to a source of electrical current and conveying a measure current into the formation at a plurality of frequencies;
   the medium comprising instructions which enable:
   (b) a processor to estimate a resistivity parameter of the earth formation based at least in part on a real and imaginary part of an impedance determined at the plurality of frequencies.

23. The computer-readable medium of claim 22 further comprising instructions which enable the processor to determine a standoff of the at least one measure electrode from the real and imaginary part of the impedance at the plurality of frequencies.

24. The computer readable medium of claim 22 wherein the medium comprises at least one of (i) a ROM, (ii) an EPROM, (iii) an EAROM, (iv) a Flash Memory, and (v) an Optical disk.

* * * * *